(12) United States Patent
Villwock et al.

(10) Patent No.: US 6,994,464 B2
(45) Date of Patent: Feb. 7, 2006

(54) CONTROL SYSTEM AND METHOD FOR CONTINUOUS MIXING OF SLURRY WITH REMOVAL OF ENTRAINED BUBBLES

(75) Inventors: Robert Donald Villwock, Grass Valley, CA (US); Joseph Richard Cochran, Grass Valley, CA (US); Bryan Louis Martel, Nevada City, CA (US)

(73) Assignee: Mobius Technologies, Inc, Grass Valley, CA (US)

( * ) Notice: Subject to any disclaimer, the term of this patent is extended or adjusted under 35 U.S.C. 154(b) by 287 days.

(21) Appl. No.: 10/412,605

(22) Filed: Apr. 10, 2003

(65) Prior Publication Data

US 2003/0227819 A1  Dec. 11, 2003

Related U.S. Application Data

(60) Provisional application No. 60/372,329, filed on Apr. 11, 2002, provisional application No. 60/372,270, filed on Apr. 11, 2002.

(51) Int. Cl.
*B01F 15/02* (2006.01)

(52) U.S. Cl. ............... 366/136; 366/152.1; 366/153.1; 366/156.2; 366/160.2

(58) Field of Classification Search ........ 366/132–134, 366/136–137, 152.1, 152.2, 153.1, 156.1, 366/156.2, 160.1, 160.2, 160.5, 162.1
See application file for complete search history.

(56) References Cited

U.S. PATENT DOCUMENTS

| | | | |
|---|---|---|---|
| 832,710 A | 10/1906 | Wade | |
| 1,560,826 A | 11/1925 | Kirschbraun | |
| 2,284,350 A | 5/1942 | Thwaits | |
| 2,584,424 A | 2/1952 | Cornell | |
| 2,932,318 A | 4/1960 | Ostberg | |
| 3,058,622 A | 10/1962 | Ballestra | |
| 3,437,276 A | 4/1969 | Gurley, Jr. et al. | |
| 4,230,630 A | 10/1980 | Mag et al. | |
| 4,275,033 A | 6/1981 | Schulte et al. | |

(Continued)

FOREIGN PATENT DOCUMENTS

JP        2003-340253    * 12/2005

(Continued)

OTHER PUBLICATIONS

H. Stone et al., "Recent Technical Advances in Recycling of Scrap Polyurethane Foam as Finely Ground Powder in Flexible Foam" *Proceedings of the Polyurethane Foam Association (PFA)*, 8 pages, May 2000.

(Continued)

*Primary Examiner*—Charles E. Cooley

(57) ABSTRACT

The present invention comprises a control system and method for the continuous mixing of slurry while removing entrained bubbles. The control system for continuous mixing of slurry with removal of entrained bubbles comprises a power and fluid rate control, wherein the powder and fluid rate control is coupled to a mixer through a powder feeder and a liquid pump. A fluid level control is coupled to the mixer and a surge tank, and a flow rate is coupled to the surge tank. The present invention also comprises a method for controlling the continuous mixing of slurry while removing entrained bubbles comprising providing a powder and fluid rate control, wherein the powder feeder and fluid rate control is coupled to a mixer through a powder feeder and a liquid pump. A fluid level coniol is coupled to the mixer and a surge tank and flow rate control is coupled to the surge tank.

20 Claims, 11 Drawing Sheets

U.S. PATENT DOCUMENTS

| | | |
|---|---|---|
| 4,334,991 A | 6/1982 | Beede |
| 4,339,358 A | 7/1982 | Schütz |
| 4,436,429 A | 3/1984 | Strong et al. |
| 4,439,042 A | 3/1984 | Bertoglio |
| 4,721,448 A | 1/1988 | Irish et al. |
| 4,759,632 A | 7/1988 | Horiuchi et al. |
| 4,810,098 A | 3/1989 | Kano et al. |
| 4,824,032 A | 4/1989 | Johansson |
| 4,844,276 A | 7/1989 | Kunze et al. |
| 4,859,072 A | 8/1989 | Fey et al. |
| 4,863,277 A * | 9/1989 | Neal et al. |
| 4,883,363 A | 11/1989 | Pillon et al. |
| 4,955,723 A | 9/1990 | Schneider |
| 5,101,849 A | 4/1992 | Richard |
| 5,152,943 A | 10/1992 | Sulzbach |
| 5,190,374 A * | 3/1993 | Harms et al. |
| 5,222,807 A | 6/1993 | Gaddis |
| 5,332,309 A | 7/1994 | Ramazzotti et al. |
| 5,451,376 A | 9/1995 | Proksa et al. |
| 5,478,147 A | 12/1995 | O'Brien et al. |
| 5,547,276 A | 8/1996 | Sulzbach et al. |
| 5,580,168 A | 12/1996 | Alireza et al. |
| 5,951,161 A | 9/1999 | Blagg |
| 6,039,470 A | 3/2000 | Conwell |
| 2002/0002208 A1 | 1/2002 | Martel et al. |
| 2003/0227817 A1 * | 12/2003 | Martel et al. |
| 2003/0227818 A1 * | 12/2003 | Villwock et al. |
| 2003/0227819 A1 * | 12/2003 | Villwock et al. |
| 2003/0233937 A1 * | 12/2003 | Martel |
| 2004/0008571 A1 * | 1/2004 | Coody et al. |
| 2004/0020540 A1 * | 2/2004 | Villwock et al. |
| 2004/0042335 A1 * | 3/2004 | Cecala et al. |
| 2004/0136262 A1 * | 7/2004 | Wilson |

FOREIGN PATENT DOCUMENTS

| | | |
|---|---|---|
| WO | WO 01/46304 A2 | 6/2001 |
| WO | 03/086604 A1 * | 10/2005 |

OTHER PUBLICATIONS

R. Villwock, "Improved Comfort Factor with Recycled Content by Reformulation of Flexible Slabstock Foams", *Polyurethanes Expo 2001*, pp. 1-6, Oct. 2001.

J. Jenson, "Real-World Economics of Polyurethane Foam Recycling", *Proceedings of the Polyurethane Foam Association Technical Program*, Arlington, VA, 6 pages, May 18, 2000.

G. Oerel, et al., Chapter 3, Raw Materials, *Polyurethane Handbook*, Hansen Publishers 2$^{nd}$ Ed., pp. 55-72, 1993.

\* cited by examiner

CONTROL SYSTEM AND METHOD FOR CONTINUOUS MIXING OF SLURRY WITH REMOVAL OF ENTRAINED BUBBLES

RELATED APPLICATIONS

This application claims the benefit of U.S. Provisional Application No. 60/372,329, filed Apr. 11, 2002 and U.S. Provisional Application No. 60/372,270, filed Apr. 11, 2002.

BACKGROUND

1. Field of the Invention

This invention relates to a control system and method for continuously preparing mixtures of powdered solids in liquids, removal of entrained bubbles from such mixtures, and for controlling such processes. The invention is particularly useful for the preparation of bubble-free slurries of finely ground polyurethane-foam particles in polyol, and for the preparation of new polyurethane articles that contain the finely ground polyurethane-foam particles.

2. Background of the System

"Polyurethane" (PUR) describes a general class of polymers prepared by polyaddition polymerization of polyisocyanate molecules and one or more active-hydrogen compounds. "Active-hydrogen compounds" include water and polyfunctional hydroxyl-containing (or "polyhydroxyl") compounds such as diols, polyester polyols, and polyether polyols. Active-hydrogen compounds also include polyfunctional amino-group-containing compounds such as polyamines and diamines. A common example of an active-hydrogen compound is a polyether polyol such as a glycerin-initiated polymer of ethylene oxide or propylene oxide. Polyether polyols useful for slabstock flexible polyurethane foams generally have a molecular weight in the range of 2000 to 6000 g/mol, a functionality in the range of 2 to 7 (preferably about 3), and a viscosity at 25° C. generally in the range of 100 to 10,000 mPa-s.

"PUR foams" are formed via a reaction between one or more active-hydrogen compounds and a polyfunctional isocyanate component, resulting in urethane linkages. PUR foams are widely used in a variety of products and applications. These foams may be formed in wide range of densities and may be flexible, semi-flexible, semi-rigid, or rigid foam structures. Generally speaking, "flexible foams" are those that recover their shape after deformation. In addition to being reversibly deformable, flexible foams tend to have limited resistance to applied load and tend to have mostly open cells. "Rigid foams" are those that generally retain the deformed shape without significant recovery after deformation. Rigid foams tend to have mostly closed cells. "Semi-rigid" or "semi-flexible" foams are those that can be deformed, but may recover their original shape slowly, perhaps incompletely. A foam structure is formed by use of so-called "blowing agents." Blowing agents are introduced during foam formation through the volatilization of low-boiling liquids or through the formation of gas due to chemical reaction. For example, a reaction between water and isocyanate forms carbon dioxide ($CO_2$) gas bubbles in PUR foam. This reaction also generates heat and results in urea linkages in the polymer. Additionally, surfactants may be used to stabilize the polymer foam structure during polymerization. Catalysts are used to initiate the polymerization reactions forming the urethane linkages and to control the blowing reaction for forming gas. The balance of these two reactions, which is controlled by the types and amounts of catalysts, is also a function of the reaction temperature. A typical foam recipe includes at least one polyol, at least one isocyanate, and also typically includes water, surfactant, and catalysts, and also optionally includes additional blowing agent, fillers, and additives for color, fire performance, antimicrobial activity, etc.

Polyurethane foam can be ground into fine particles using, for example, cryogenic processes or roll mills (see for example, U.S. Pat. No. 6,670,404, incorporated herein by reference). These fine particles can then be used to replace chemicals in recipes for new foam. The use of recycled polyurethane foam provides an environmental benefit and often a cost savings.

In order to add polyurethane powder to the recipe, the powder must be mixed with liquid reactants. Further, the slurry must be free of entrained bubbles because they create an undesirable irregular cell structure in the foam, including holes and splits. Powder can be mixed with liquid reactants in a batch process by adding a known mass of powder to a known mass of polyol, mixing thoroughly, and allowing sufficient time (generally about 8 to 48 hours) for entrained bubbles to leave the slurry. Such a natural de-gassing process takes a long time because the slurry has a high viscosity, generally about 500 to 20,000 mPa-s. A continuous process for removal of entrained air is preferred over a batch process because the continuous process would not require waiting for entrained air to leave the slurry naturally, and the continuous processes would not require the large storage capacity necessary to hold the slurry needed for an entire day of foam production.

Methods are desirable for producing bubble-free slurries of fine particles of polyurethane in polyol, and for producing foam with these slurries. Particularly, a need exists for devices and processing methods to take finely ground polyurethane-foam particles, disperse them as a slurry in polyol, remove substantially all entrained bubbles from the slurry, and to use this slurry as a direct replacement for at least some of the polyol in the production of new polyurethane articles. It is further desirable for such a process to be able to run continuously, such that powder and polyol are mixed, de-gassed, and used to make new polyurethane articles without delay. The desired continuous process must be able to deliver bubble-free slurry with an accurately controlled solids concentration at an accurately controlled flow rate.

SUMMARY OF THE INVENTION

The present system comprises a control system and method for the continuous production of substantially bubble-free slurries of solid powders in liquids and for the delivery of such slurries at an accurately controlled concentration and flow rate. The system also comprises a method of controlling the process operation while providing accurate and stable slurry concentration and flow rate.

Powder and liquid (for example, finely ground polyurethane powder and polyol liquid) are delivered continuously to a mixer where they are contacted intimately and a slurry is produced. In the present disclosure, a slurry is defined as a mixture of a liquid and a solid in which at least some of the solid does not dissolve, and is meant to include both mixtures that naturally separate and stable suspensions. The slurry, which may contain entrained air bubbles, is delivered from the mixer to a de-gassing step, where entrained bubbles are continuously removed. Substantially bubble-free slurry is continuously delivered from said de-gassing step to downstream uses.

A feedback control system provides for continuous operation of the process with good control over the slurry concentration and flow rate. The description of the control process begins from the end of the process. The flow rate of the finished slurry is measured, for example by a mass flow meter, preferably by an in-line coriolis-effect mass flow meter. The flow rate measurement is used to control the rate of the pump that is drawing slurry from the bottom of the surge tank. The amount of slurry in the surge tank is measured, for example by a level sensor, preferably by a continuous ultrasonic level sensor. The level measurement is used to control the rate of the transfer pump that is drawing slurry from the bottom of the mix tank and delivering the slurry to the centrifuge. The amount of slurry in the mix tank is measured, for example by a level sensor, preferably by a continuous capacitance level sensor. The level measurement is used to control the reference rate of powder addition to the mixer. The actual rate of powder addition to the mixer is measured, for example by a scale, preferably by a loss-in-weight feeder. The actual rate of powder addition to the mixer is used to determine algebraically the required rate of polyol addition to the mix tank in order to provide the desired slurry concentration. The rate of the polyol supply pump is controlled in this way by the actual rate of powder addition to the mixer and the desired slurry concentration. This control method provides excellent control of the slurry concentration because powder and polyol are always added to the mix tank together in the desired ratio. The control method also provides excellent control of the slurry output flow rate, even if the rate of powder addition to the mix tank is varying.

A better understanding of the features and advantages of the present system will be obtained by reference to the following detailed description of the system and accompanying drawings which set forth an illustrative embodiment in which the principles of the system are utilized.

DETAILED DESCRIPTION OF THE SYSTEM

Figure 1:
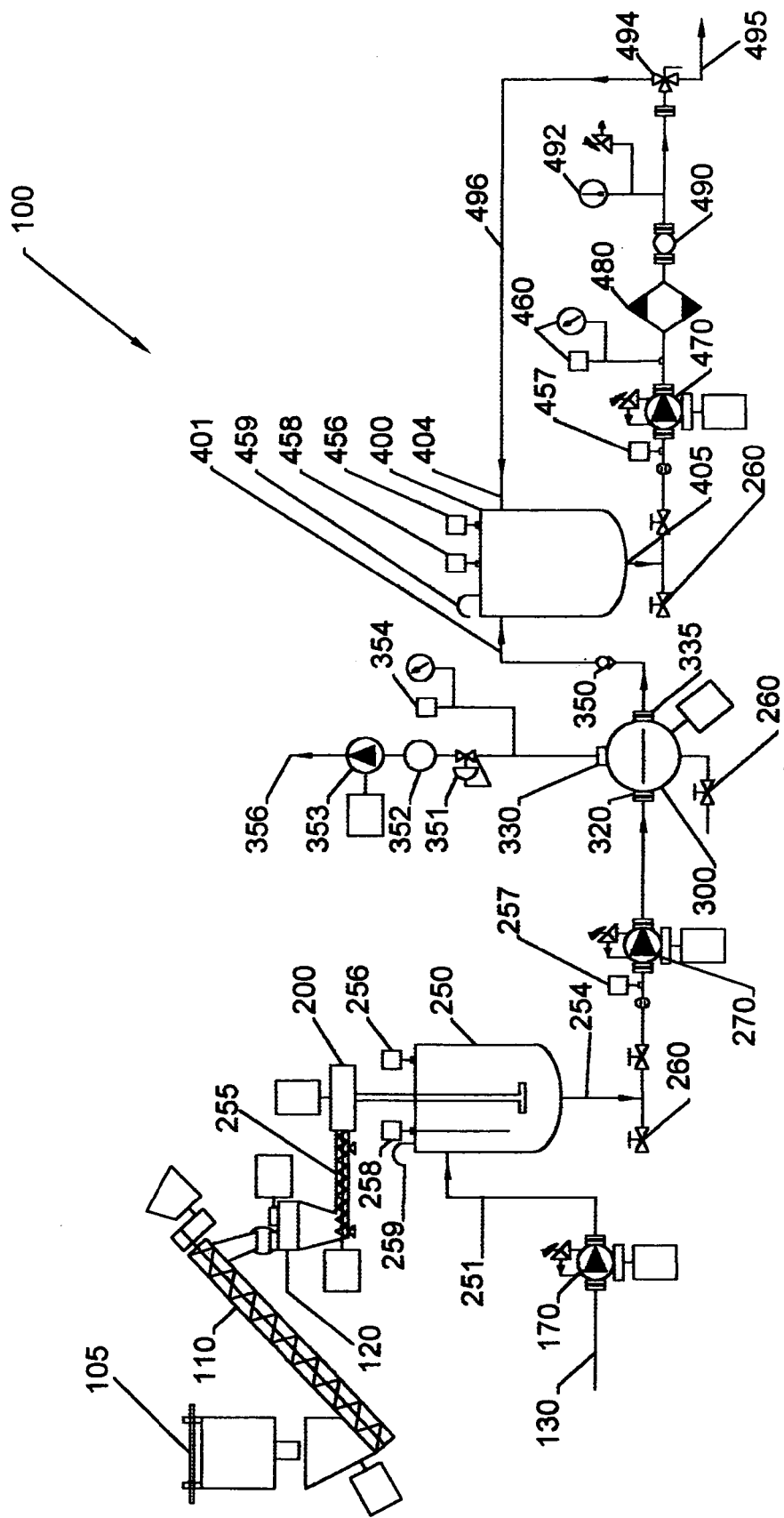
FIG. 1 is a process-flow diagram showing a process for the continuous production of substantially bubble-free slurry.

A schematic diagram of a process of the present disclosure is shown in FIG. 1. Solid powder 105 (supplied for example in bulk bags, or from a silo) is conveyed by suitable means 110 (for example, a screw conveyor) to the hopper of a powder feeder 120. For example, the powder feeder may be a loss-in-weight belt, or loss-in-weight screw feeder, or volumetric powder feeder coupled with a device for measuring powder flow rate, such as an impact flow meter. The powder feeder 12 delivers powder at a known and controlled rate to the mixer 200 (for example, the disclosed mixer described in detail below) in tank 250. A liquid component (for example, polyol) is added to tank 250 through inlet 251. This liquid component is added at a known and controlled rate, for example by means of a non-cavitating positive displacement pump 170, with a known and controlled speed of rotation, drawing from the tank (not shown) or other source of liquid 130. Alternatively, the rate of liquid addition can be measured with a flow meter, or by means of volume or weight changes in the tank or other source of liquid. The mixer 200 in tank 250, as described in detail below, performs the function of thorough mixing of the powder into the liquid with good dispersion and wet-out of the powder. The mixed slurry, which also generally contains bubbles, exits tank 250 through an outlet 254. In the present disclosure, slurry is defined as a mixture of a liquid and a solid in which at least some of the solid does not dissolve, and is meant to include both mixtures that naturally separate and stable suspensions. Drain valves 260 are provided throughout the process for cleanup and shutdown. Tank 250 may have a vent 259, a continuous-level sensor 258, a high-level sensor 256, and a low-level sensor 257 for measurement and control (see FIG. 6) of the liquid level in the tank. The ratio of powder addition rate to liquid addition rate to the mixer/tank is controlled.

At mix-tank outlet 254, entrained bubbles may typically be present in the slurry at a concentration on the order of about 10% by volume. Mixed slurry is drawn from tank 250 through outlet 254 by any suitable means (gravity, pump, vacuum suction), for example a positive-displacement pump 270, and transferred to inlet 320 of vacuum centrifuge 300. Vacuum centrifuge 300 continuously removes entrained bubbles from the slurry as described in connection with FIG. 4 below. Vacuum is drawn from centrifuge 300 to maintain within it a low absolute pressure, for example less than 1050 mbar, preferably between 1 and 300 mbar. Vacuum is drawn using suitable means, for example vacuum pump 353 with regulator 351, condensate trap 352, pressure measurement device 354, and exhaust to the atmosphere 356. Substantially bubble-free slurry exits the centrifuge 300 through outlet 335. Check valve 350 allows the slurry to pass to an inlet 401 of at least one surge tank 400 without backflow of slurry or air into the centrifuge.

Surge tank 400, or a plurality of such tanks, may be large enough to hold enough slurry for a full day of foam production. In such a case, the process is used to prepare a large batch of substantially bubble-free slurry. FIG. 1 depicts a process that is also suitable for producing slurry continuously and using that slurry for foam production without delay.

Surge tank 400, described in detail below, may have a vent 459, and continuous-level sensor 458, a high-level sensor 456, and a low-level sensor 457 for measurement and control (see FIG. 6) of the liquid level in the tank.

Substantially bubble-free slurry exits the surge tank through outlet 405, drawn by any suitable means (gravity, pump, vacuum suction), for example a non-cavitating positive-displacement pump 470. The mass flow rate is measured with meter 490, for example 490 may be an in-line coriolis-effect mass-flow meter. By means of three-way diverter valve 494, the slurry is transferred to downstream processes (for example, foam manufacture or storage) via conduit 495, or recirculated to inlet 404 of surge tank 400 via conduit 496. The option for recirculation to the surge tank allows simple integration of the process to existing slabstock polyurethane-foam manufacturing plants. For example, valve 494 may be located in close proximity to the mix head of a slabstock machine, mixing process 100 can be running prepared slurry via recirculation line 496, and substantially bubble-free slurry can be available to the foam-manufacture process immediately with a turn of valve 494. Similarly, valve 494 can be used to switch off downstream use of the slurry without interruption of mixing process 100. This effectively decouples the downstream foam-manufacture process from any startup or shutdown transients of mixing process 100. In an integrated plant, valve 494 may be automatically actuated, for example by a downstream process-control system.

Optionally, the prepared slurry may be heated or cooled using heat exchanger 480. The temperature and pressure of the slurry may be measured using meters 492 and 460 respectively. Additional meters (not shown) may measure viscosity, solids concentration, entrained air content, and the like.

Figure 2:
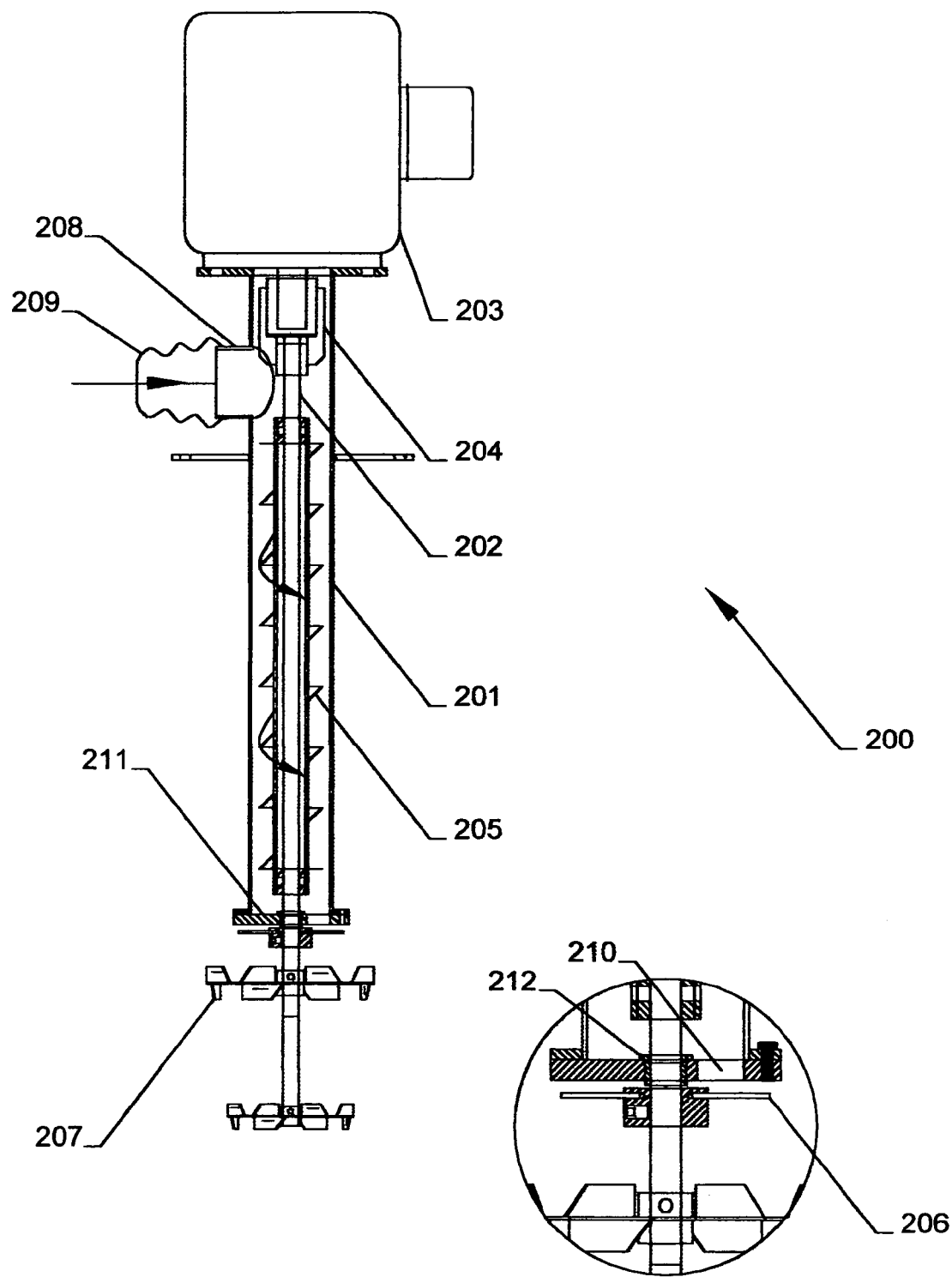
FIG. 2 is a schematic diagram of the disclosed mixer.
Figure 3:
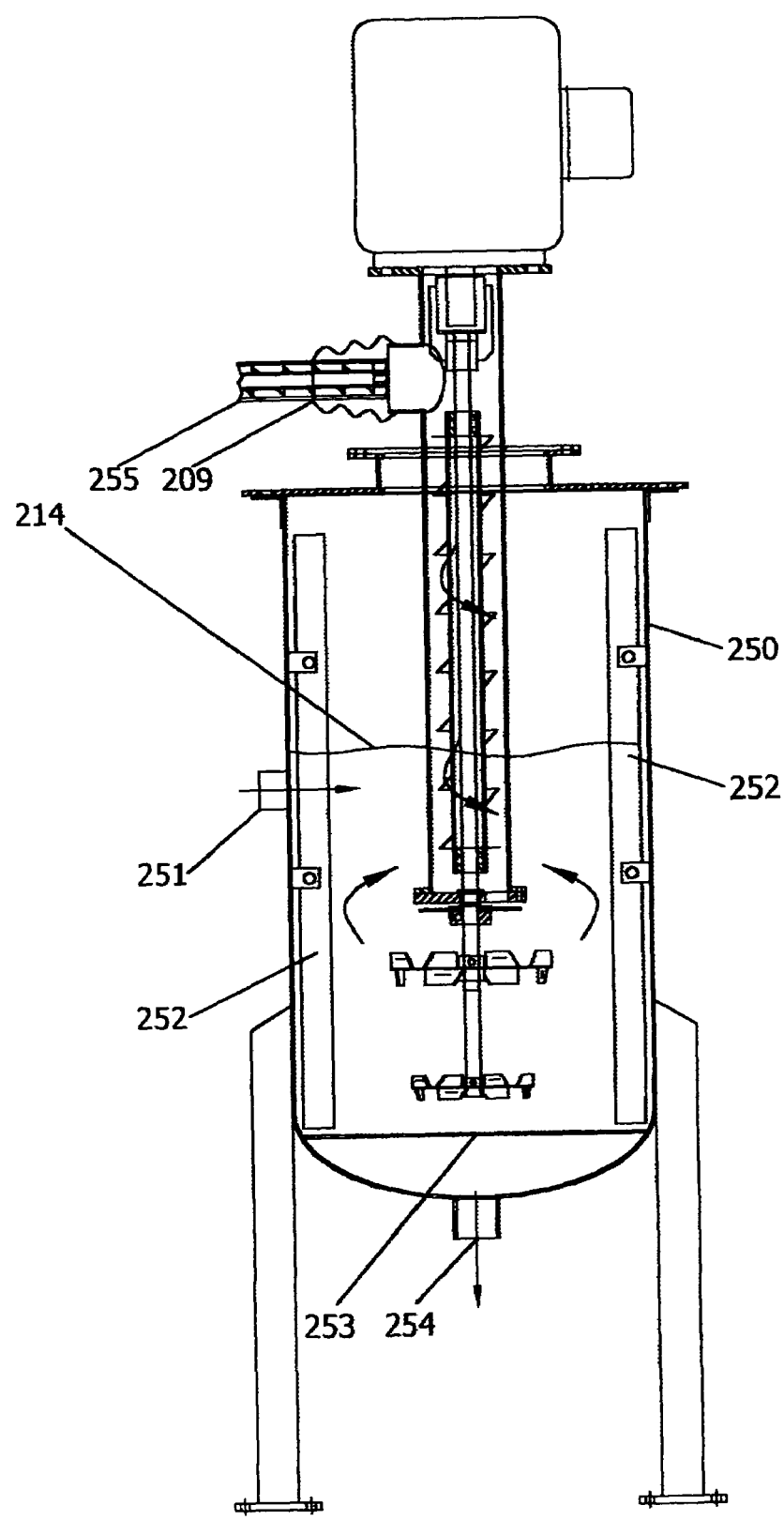
FIG. 3 is a schematic diagram of the disclosed mixer of FIG. 2 integrated with a mix tank.

Referring now to FIGS. 2 and 3, the mixer assembly 200 comprises a barrel 201 within which a shaft 202 is rotated by a motor 203 through coupling 204. An auger 205, a lump-breaker 206, and at least one impeller 207 are attached to and rotate with shaft 202. Powder is added to the mixer at a known, controlled rate through port 208. A flexible boot 209 seals the port to the perimeter of powder feeder 255 in such a way as to avoid blowing dust while maintaining mechanical isolation of the mixer from powder feeder. If the powder feeder is a loss-in-weight feeder, mechanical isolation of the feeder from the mix tank is important so that the weight measurement is not biased. Powder drops through port 208 onto auger 205. The auger rapidly moves the powder through barrel 201 to the outlet 210. A bearing plate 211 is positioned at the outlet 210 of the barrel 201 and supports a bearing 212 for shaft 202 by means of a spider (not shown).

The outlet of the barrel 210 is positioned at or below the working liquid level 214 in the tank 250. Powder exits outlet 210 and is rapidly dispersed into the surrounding liquid by lump-breaker 206. The lump-breaker comprises a radial arrangement of stiff pins affixed around a central hub. The pins are long enough to span the entire opening of outlet 210. The lump-breaker is positioned very close to the outlet so that no large lumps of powder may pass.

Impellers 207 are positioned below the lump-breaker and are of suitable size and design to provide multiple turnovers of the tank volume within the mean residence time of the powder. Preferably, at least one impeller is a radial-flow high-shear design. Axial-flow impellers (for example, marine impellers) provide higher flow and more tank turnovers. Preferably, one impeller is placed near the lump-breaker for good mixing, and a second impeller is placed near the bottom of the tank to avoid settling of solids.

The liquid component of the slurry (for example, polyol) is added to tank 250, preferably at a position near the working liquid level 214, by means of at least one inlet 251. The tank preferably has a plurality of baffles 252 to reduce the formation of a vortex. Near the bottom of the tank, a screen plate 253 is attached. The screen plate has a plurality of openings that allow mixed slurry to pass through, but that returns larger un-dispersed lumps of powder for additional mixing. Preferably the openings in the screen plate have a size of about 0.1 to 1 cm. Mixed slurry leaves the mix tank through an opening 254 in the bottom.

Figure 4:
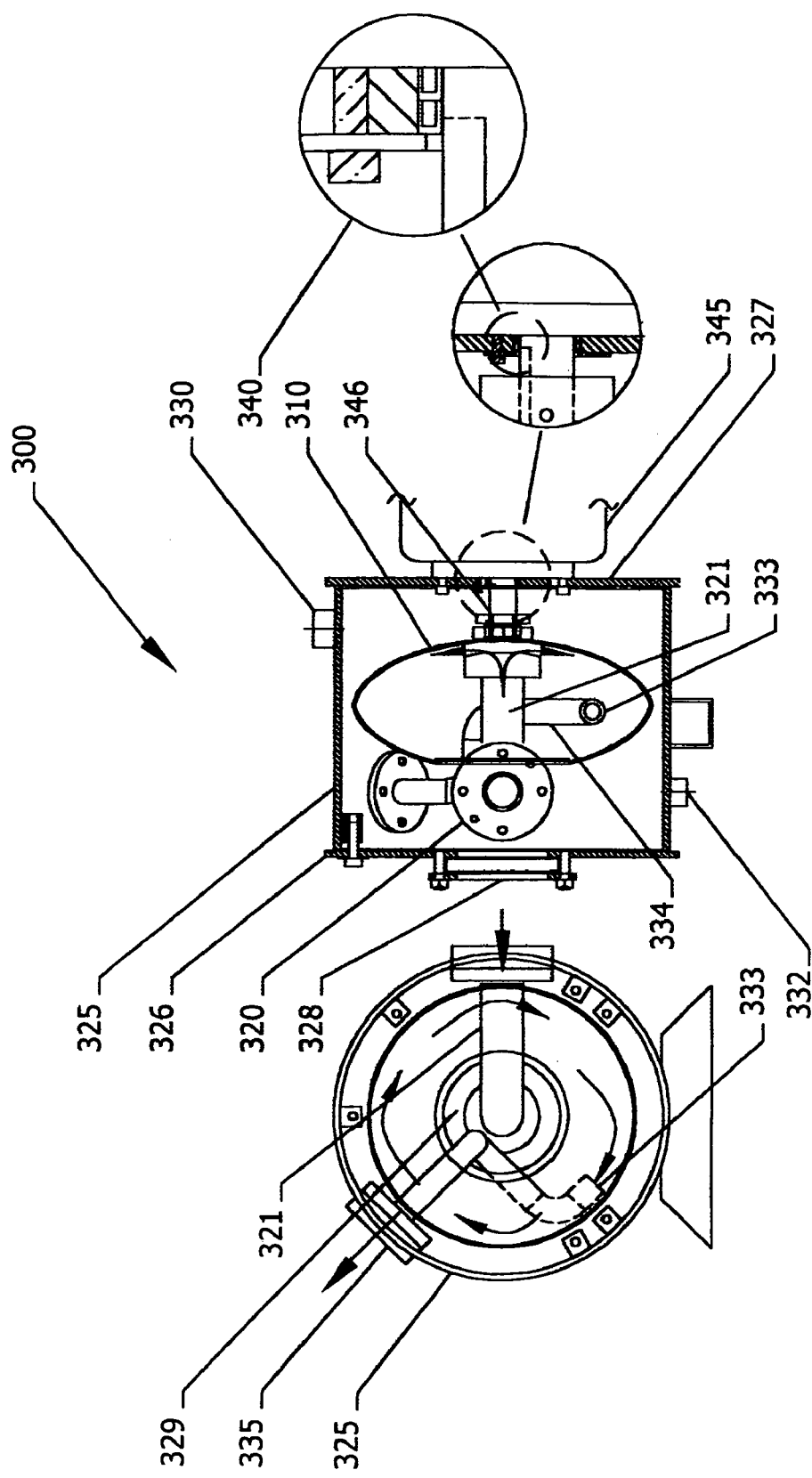
FIG. 4 is a schematic diagram of a centrifuge within a vacuum chamber for removal of entrained air bubbles from a slurry.
Figure 5:
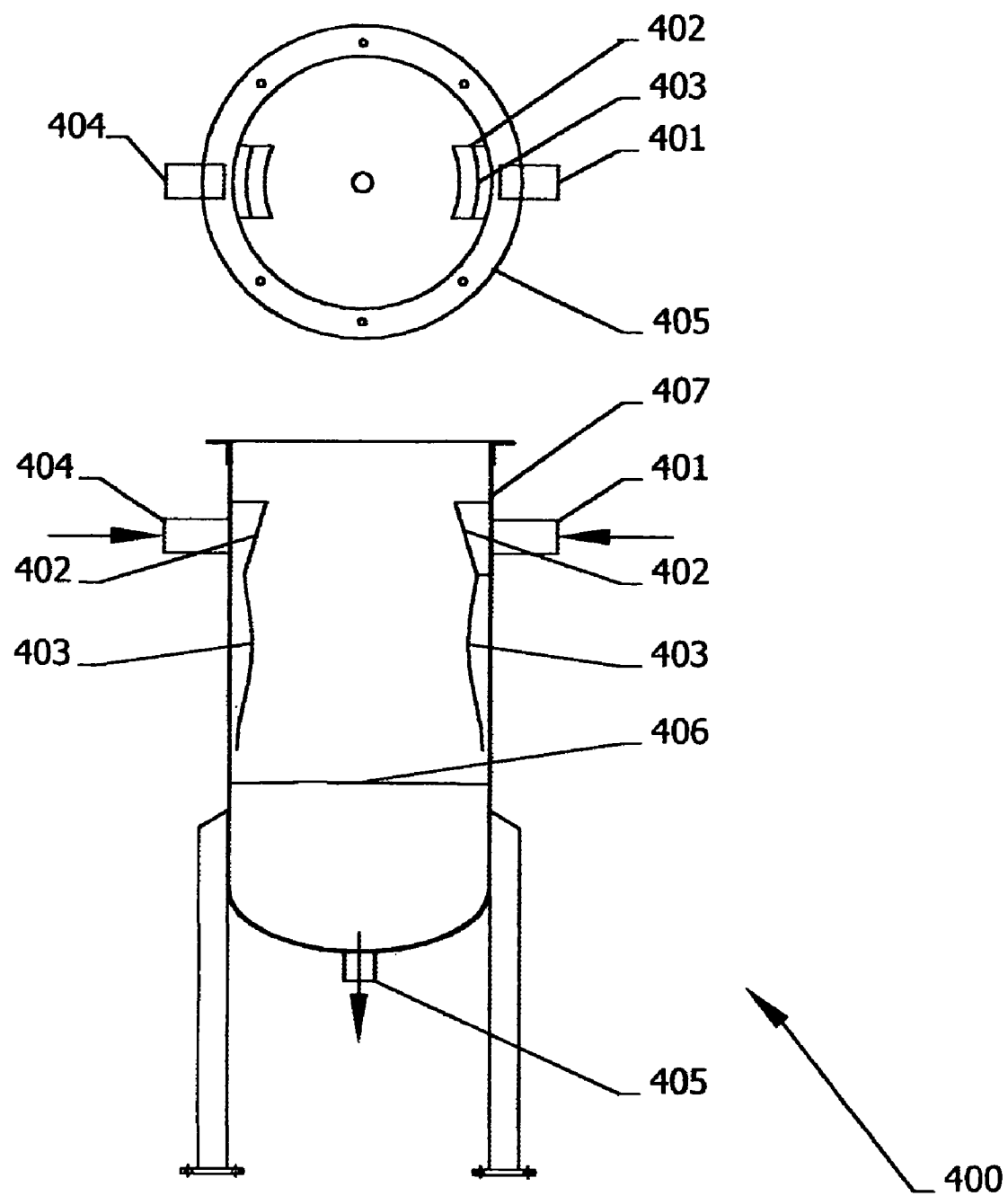
FIG. 5 is a schematic diagram of the disclosed surge tank.

FIGS. 4 and 5 show schematic diagrams of a vacuum centrifuge 300 useful for removal of entrained bubbles from a liquid and a surge tank 400 useful for accumulating substantially bubble-free liquid without re-entrainment of bubbles. In the context of the vacuum centrifuge and surge tank, a "liquid" includes pumpable mixtures of solid particles in liquids, such as slurries of powders in liquids or slurries of finely ground polyurethane powder in polyol.

Referring now to FIG. 4, liquid to be de-gassed is delivered to inlet 320 of the centrifuge and travels through conduit 321 to bowl 310. Bowl 310 is attached to shaft 346 such that the bowl and shaft are rotated by suitable means, for example motor 345. When bowl 310 is rotated such that the tangential velocity is high (for example, between 10 and 100 m/s) the liquid spreads out thinly along the inside surface of the bowl, forcing bubbles to the surface under centripetal force and rupturing them. The liquid pools as far away from the axis of rotation as possible. A pickup tube 333 catches the liquid and directs it through conduit 334 to outlet 335. The rotation of the bowl imparts sufficient energy to the liquid to pump it through conduit 334. A baffle 329 is affixed to conduit 321 and serves to keep liquid from splashing out of the bowl.

The spinning bowl 310 is disposed within a vacuum chamber 325, which has front plate 326 and back plate 327 attached with gaskets to make the chamber vacuum tight. Plate 327 contains a bearing-and-seal assembly 340, through which shaft 346 rotates. Plate 326 optionally has a sealed sight glass 328 to allow viewing of the spinning bowl. Vacuum is applied to the chamber, for example through fitting 330. The low absolute pressure within the chamber (for example, 1 to 300 mbar) prevents bubbles from being re-entrained in the liquid as it is picked up (333) and directed toward outlet 335. Substantially bubble-free liquid is available from outlet 335. A drain 332 may be provided to facilitate cleanup and shutdown.

Referring now to FIG. 5, a liquid is delivered to inlet 401. Inlet 401 is positioned near the top of the tank, while outlet 405 is at the bottom of the tank. This arrangement of inlet and outlet provides for desirable first-in-first-out operation of the tank, but presents the potential for entrainment of bubbles due to jetting or splashing of the liquid. Weir 402 prevents the liquid from jetting into the tank, rather the liquid is diverted such that it runs down the wall of tank 407. Flexible weir extension 403 keeps the liquid running down the wall of the tank even at low flow rates. Liquid runs between the extension 403 and the wall of tank 407, and sucks extension 403 against the wall. This avoids any liquid dripping, "raining", or otherwise falling through an air space between inlet 401 and free surface 406. The extension 403 may be made of flexible plastic sheet, for example.

FIG. 5 depicts the tank 407 as partially full, as it would be during startup from an initially empty condition. During initial filling, the liquid has the furthest distance to travel from inlet 401 to the free surface 406, and there is potential for entrainment of bubbles. Forcing the liquid to run down the side of the tank with weir 402 and extension 403 greatly reduces the potential for bubble entrainment.

Surge tank 400 may have a plurality of inlets 401 with their associated weirs 402 and extensions 403. For example, inlet 401 may be used to receive liquid coming from outlet 335 of vacuum centrifuge 300, while inlet 404 may be used to receive liquid recirculating from outlet 405 through downstream processes.

Figure 6:
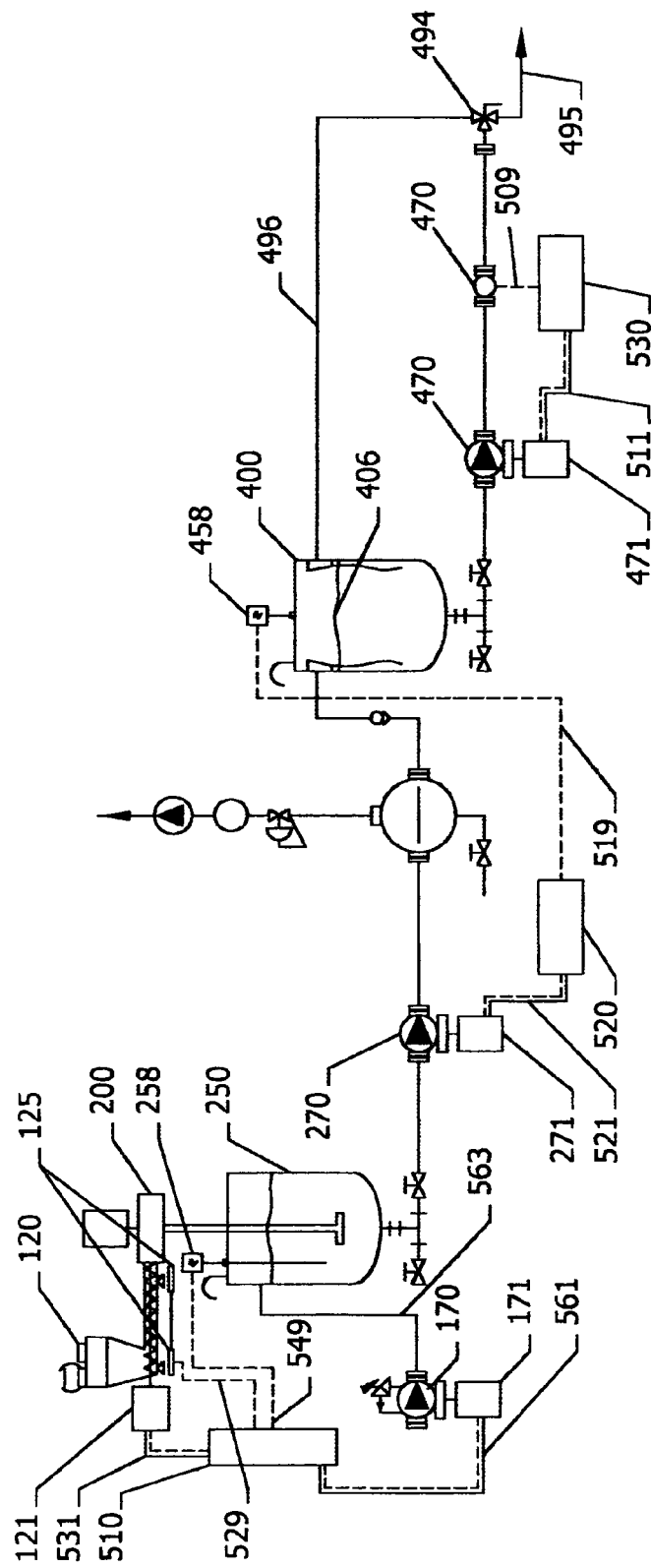
FIG. 6 is a schematic diagram showing a process for the continuous production of substantially bubble-free slurry with the disclosed process-control method.

The disclosed feedback control system, which provides for continuous operation of the disclosed mixing process with control over the slurry concentration and flow rate, is depicted in FIG. 6.

The flow rate of the finished, substantially bubble-free slurry is measured, for example by a flow meter 490, preferably by an in-line coriolis-effect mass flow meter. In-line coriolis-effect mass flow meters are well known to those of ordinary skill in the art and will not be discussed herein to avoid obscuring the present invention. As also well known to those of ordinary skill in the relevant art, many other instruments may be used to measure flow rate and the in-line coriolis-effect mass flow meter is an illustrative example only. The flow rate measurement 509 is used to control the rate of the pump 470 by means of flow rate control system 530.

Figure 7:
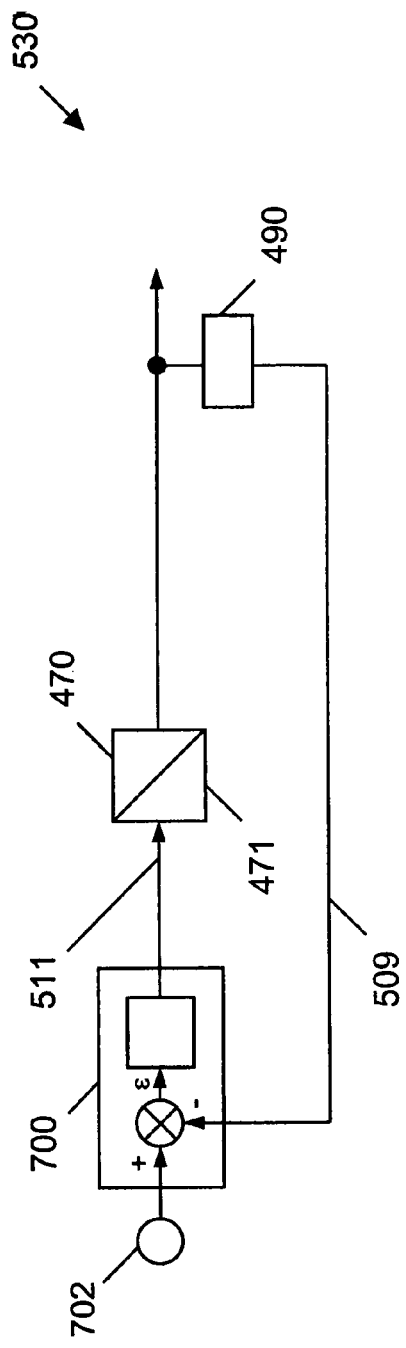
FIG. 7 is a schematic block diagram of one embodiment of a flow rate control system to control the flow rate of a slurry.

An embodiment of flow rate control system 530 is shown in FIG. 7. Similar reference numbers are used to describe and reference similar elements as shown and described in previous figures. New reference numbers are used to designate elements not previously designated as required. Flow rate controller 700 receives measurement data 509 from the output of pump 470 (for example by means of flow meter 490) and flow-rate data setpoint 702 as inputs, and provides a slurry output signal 511 to a variable-speed drive 471 for pump 470 (shown in FIG. 7 as one symbol having two reference numbers). Thus, flow rate control system 530 maintains the flow rate of slurry within a range of flow-rate data setpoint 702. As used in this specification, a data setpoint defines data that is specified from an external source (for example, a human operator or a separate process control system) to the process. For example, flow-rate data setpoint 702 could be the desired flow rate of a slurry of polyurethane powder in polyol to a flexible-polyurethane-foam manufacturing line, where a desired flow rate is chosen by the operator or chemist to provide the correct recipe for the desired foam properties. The flow-rate setpoint could be specified by the operator of the foam plant, or it could be supplied as a signal from the process-control system for the foam plant. Pump 470 is in fluid communication with surge tank 400.

Returning to FIG. 6, the amount of slurry in a surge tank 400 is measured, for example by a level sensor 458, preferably by a continuous ultrasonic level sensor. The fluid level measurement 519 is used to control the rate of the transfer pump 270 by means of fluid level control system 520.

Figure 8:
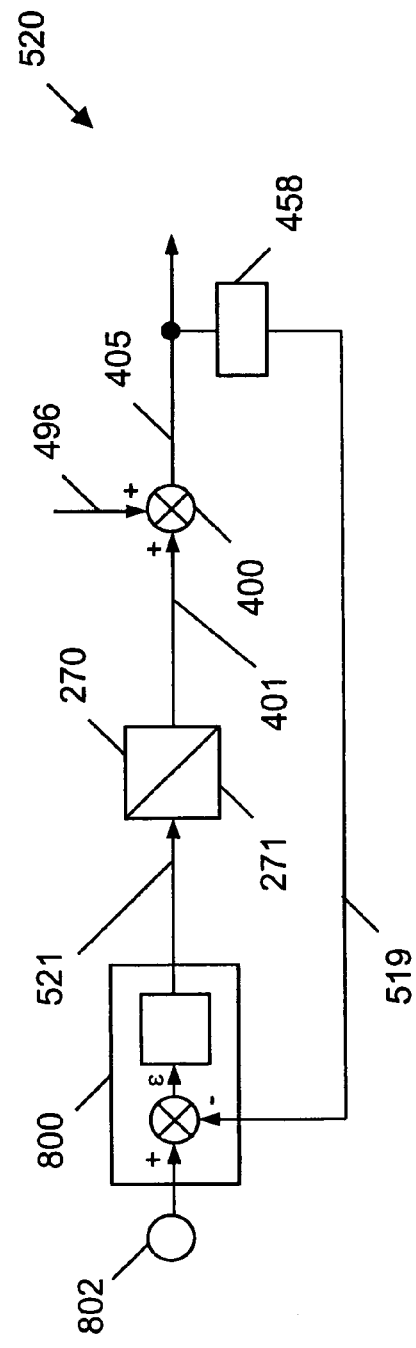
FIG. 8 is a schematic block diagram of one embodiment of a fluid level control system to control the fluid level in a surge tank.

An embodiment of fluid level control system 520 is shown in FIG. 8. Similar reference numbers are used to describe and reference similar elements as shown and described in previous figures. New reference numbers are used to designate elements not previously designated as required. As shown in FIGS. 6 and 8, fluid level controller 800 takes fluid level measurement data 519 from fluid level sensor 458 and fluid level data setpoint 802 as inputs, and provides a slurry output signal 521 to a variable-speed drive 271 for pump 270 (shown in FIG. 8 as one symbol having two reference numbers). The amount of material in surge tank 400 is affected by slurry added by means of pump 270 through input line 401, slurry removed by pump 470, and possibly slurry recirculating from downstream process through input line 496. Through output 405 of surge tank 400, a fluid level sensor 458 is used to determine the actual level amount of material (e.g, a level sensor) in surge tank 400 and sends fluid level measurement data 519 to fluid level controller 800. Thus, fluid level control system 520 maintains the amount of slurry in surge tank 400 within a range of fluid level data setpoint 802. Pump 270 is in fluid communication with mix tank 250.

Returning now to FIG. 6, the amount of slurry in a mix tank 250 is measured, for example by a level sensor 258, preferably by a continuous capacitance level sensor. The measurement data 549 is used to control rate of powder addition to the mix tank and to control the rate of liquid addition to the mix tank by means of powder and fluid rate control system 510 (see also FIGS. 9a, 9b, and 9c) that takes measurement data 549 and provides an output signal 531 (a powder reference rate of addition to the mixer) to a means for adding powder to the mixer, such as powder feeder 120, and an output signal 561 (a liquid reference rate of addition to the mixer) to a means for adding liquid to the mix tank, such as liquid pump 170.

Thus, powder and fluid rate control system 510 can maintain the amount of slurry in mix tank 250 within a range of mix-tank level setpoint 902 as shown in FIGS. 6 and 9a–9c. Powder and fluid rate control system 510 also performs the function of calculating the rate of powder and rate of liquid addition to the mixer such that the ratio of the two rates, that is the concentration of the powder, is controlled at a predetermined setpoint concentration 904. Powder and fluid rate control system 510 may be provided with either or both of reference and actual flow rate signals.

Figure 9A:
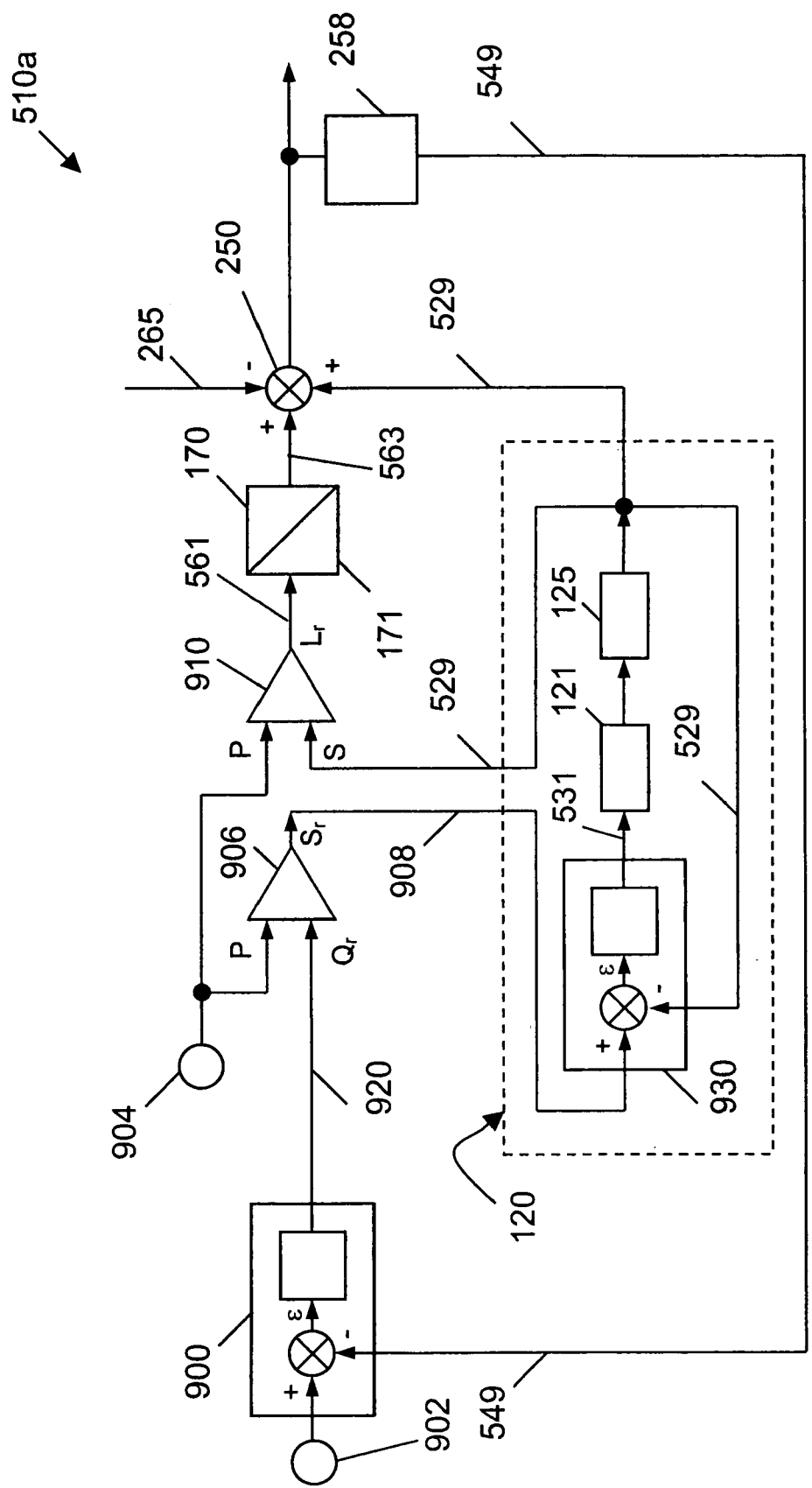
FIG. 9a is a schematic block diagram one embodiment of a powder and fluid rate control system to the solids concentration and the fluid level in a mix tank.

FIG. 9a illustrates one embodiment of a powder and fluid rate control system 510. Similar reference numbers are used to describe and reference similar elements as shown and described in previous figures. New reference numbers are used to designate elements not previously designated as required. In this embodiment, the ratio of the actual rate of powder and the reference rate of liquid addition is controlled. As shown in FIGS. 6 and 9a, a sensor 258 (e.g., a level sensor) is used to sense the amount of material in mix tank 250 and sends a fluid level signal 549 to powder and fluid rate controller 900.

Referring back to FIG. 9a, powder and fluid rate controller 900 compares the amount of material in the mix tank represented by signal 549 to powder and fluid rate setpoint data 902, and provides an output data signal 920 that represents a reference slurry rate of addition to the mix tank, or $Q_r$. A first calculation element 906 performs an algebraic calculation of the reference powder rate of addition to the mix tank and provides output signal 908, or $S_r$, using $Q_r$ and predetermined setpoint concentration data 904, or P. The units for concentration P may be specified in many ways known in the art, for example, by mass or volume, as a fraction, percent, or ratio, or by some other measure of concentration such as a material property, for example, specific gravity, opacity, absorbance, etc.

In the polyurethane foam industry, a useful measure of the concentration of powder materials in polyol liquids is "parts per hundred parts of polyol" (pphp). A slurry of polyurethane powder in polyol with a concentration of 15 pphp has 15 parts by mass of polyurethane powder in 100 parts by mass of polyol, or a mass fraction of polyurethane powder of about 0.13. For example, if concentration P is specified in units of pphp, the calculation of $S_r$ performed by calculation element 906 is:

$$S_r = Q_r P/(P+100)$$

Still referring to FIG. 9a, output signal 908 representing $S_r$, the reference powder rate of addition to the mix tank, is received by a device that provides a means of adding powder to the mix tank 250 or the mixer 200, for example powder controller 930 of powder feeder 120.

The actual rate of powder addition to the mixer is measured, for example by a scale 125 (more specifically a time-derivative of a scale measurement). In this example, a loss-in-weight feeder is used as the scale. The measured actual rate of powder addition, 529, or S, is used to control the rate of powder addition to the mixer by means of a controller 930 that takes measurement 529 and reference powder rate of addition to the mix tank 908 as inputs, and provides an output signal 531 to a variable-speed drive 121 for powder feeder 120. Thus, powder controller 930 maintains the rate of powder addition to the mixer 200 or mix tank 250 within a range of a reference powder rate of addition to the mix tank 908. Commercially available loss-in-weight feeders generally include feeder 120, drive 121, scale 125, rate measurement 529, powder controller 930, and control signal 531 in an integrated package.

The measured actual rate of powder addition to the mixer, 529, is also used by a second calculation element 910 to determine algebraically the reference liquid rate of addition to the mix tank 561, or $L_r$, in order to synchronize the liquid and powder addition with the setpoint slurry concentration 904, or P. For example, if concentration P is specified in units of pphp, the calculation of $L_r$ performed by second calculation element 910 in this embodiment is:

$$L_r=100S/P,$$

which uses the actual rate of powder addition and the setpoint concentration.

A signal representing $L_r$, the reference liquid rate of addition signal 561 to the mix tank 250, is received by a device that provides a means of adding liquid to mix tank 250 or the mixer 200, for example variable-speed drive 171 of pump 170. This control method provides excellent control of the slurry concentration because powder and liquid are always added to the mix tank together in the desired ratio corresponding to setpoint concentration data 904. Because the flow rate of slurry from process 100 at stream 495 (see FIG. 1) is controlled separately by control system 530 (see FIG. 6), excellent control of the slurry output flow rate is provided, even if the actual rate of powder addition 529 to mix tank 250 is varying. The amount of material in mix tank 250 is affected by the actual liquid addition 563, the actual powder addition 529, and the actual slurry flow rate from the mix tank 265 to downstream process. A sensor 258 (e.g, a level sensor) determines the amount of material in mix tank 250 and sends a signal 549 to powder and fluid rate controller 900.

Figure 9B:
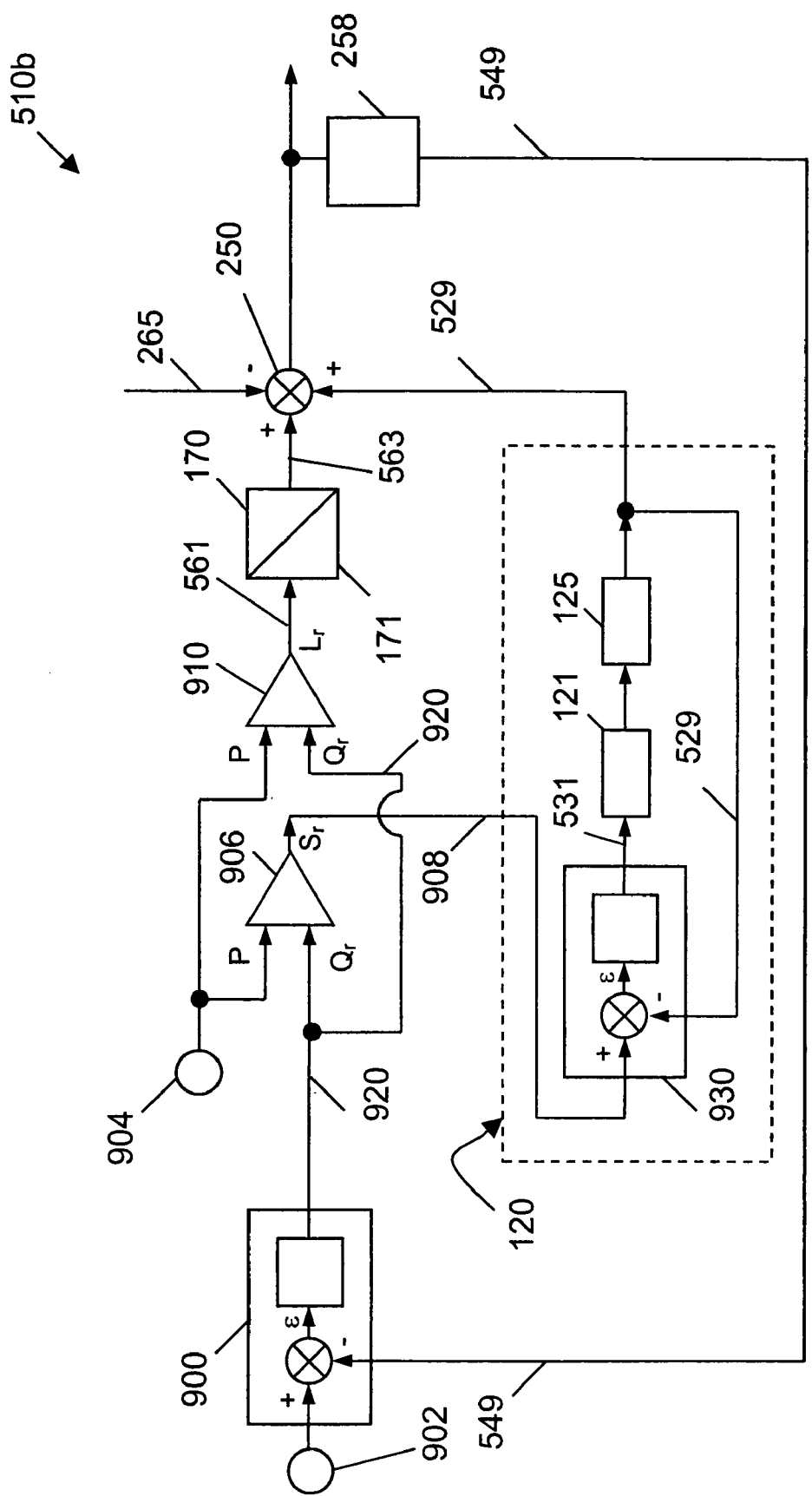
FIG. 9b is a schematic block diagram for another embodiment of a powder and fluid rate control system to the solids concentration and the fluid level in a mix tank.

An alternative embodiment of powder and fluid rate control system 510 is shown in detail by FIG. 9b. In this embodiment, powder and fluid rate control system 510 is substantially the same as that shown in FIG. 9a and described above, with the exception that output signal 920 (representing reference slurry rate of addition to the mix tank, or $Q_r$) is provided to calculation element 910 instead of signal 529 (representing actual powder rate of addition to the mix tank, or S). In this way, powder and fluid rate controller 900 is used to set the reference rates of addition to the mix tank for both the powder (908) and the liquid (561) with first and second calculation elements 906 and 910. In this embodiment, second calculation element 910 performs a different calculation. That is, it calculates $L_r$ from P and $Q_r$. For example, if concentration P is specified in units of pphp, the calculation of $L_r$ performed by calculation element 910 in this embodiment is:

$$L_r=100Q_r/(P+100),$$

which uses the reference rate of slurry addition and the setpoint concentration.

Figure 9C:
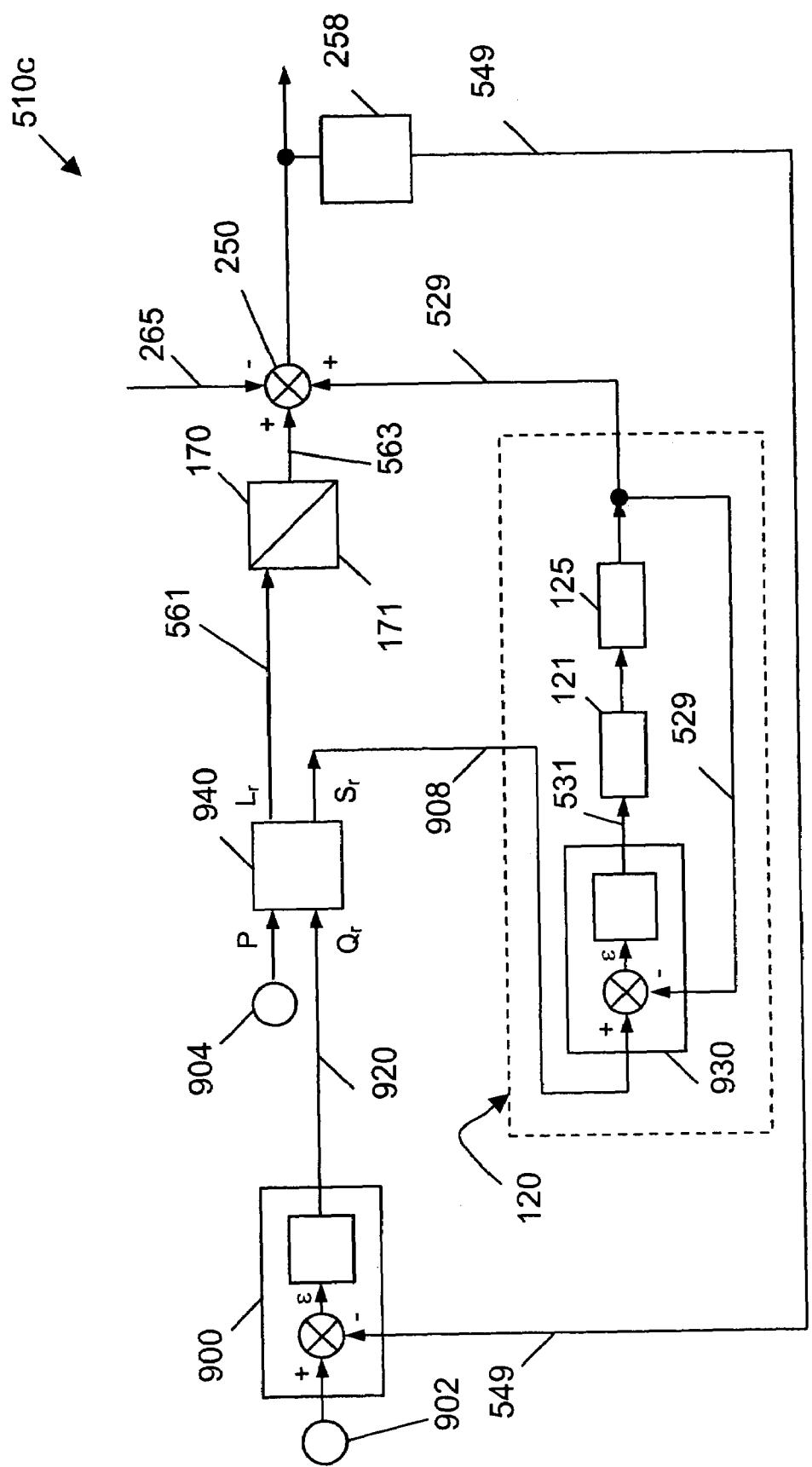
FIG. 9c is a schematic block diagram for yet another embodiment of a powder and fluid rate control system to the solids concentration and the fluid level in a mix tank.

Yet another embodiment of powder and fluid rate control system 510 is shown in detail in FIG. 9c. This embodiment is substantially the same as that shown in FIG. 9b and described above, with the exception that first and second calculation elements 906 and 910 are replaced by a single calculation element 940, which calculates reference rates of addition to the mixer of both liquid (561, or $L_r$) and powder (908, or $S_r$) from reference slurry rate of addition to the mixer 920 ($Q_r$) and concentration setpoint 904 (P). For example, if concentration P is specified in units of pphp, the calculations performed by single calculation element 940 are:

$$L_r=100Q_r/(P+100), \text{ and}$$

$$S_r=Q_rP/(P+100),$$

which use the reference rate of slurry addition and the setpoint concentration.

Powder and fluid rate controller 900, powder controller 930, fluid level controller 800, and flow rate controller 700 may be of any type known to one skilled in the art, including but not limited to proportional, on-off, proportional-integral-derivative (PID) controllers. The controllers as used in this system may also be, for example, analog, digital, software-based, programmable logic controllers (PLC), pneumatic, electrical, optical, hydraulic, etc. Similarly, the measurement data (509, 519, 529, and 549), the control signal data (511, 521, 531, 541, 551, 908, 920 and 561), and the setpoint data (702, 802, 902, and 904) may be obtained by any device known to those skilled in the art, including but not limited to analog, digital, pneumatic, electrical, optical, and hydraulic devices.

The process is started up by an initial partial fill of the mix tank 250 with a known amount of liquid sufficient to cover the outlet 210 of mixer 200. A known amount of powder is then added to the liquid in order to make a starting batch with the setpoint concentration. Once this initial batch has been made, the process may run continuously, with powder and liquid added to the mixer or mix tank, slurry material being drawn from the mix tank through the deaerator to the surge tank, slurry being drawn from the surge tank to downstream processes (for example, intermediate storage or polyurethane manufacture), and with the amount of material in the mix tank controlled within a range of setpoint 902, the amount of material in the surge tank controlled within a range of setpoint 802, the slurry concentration controlled within a range of setpoint 904, and the flow rate of slurry controlled within a range of setpoint 702.

EXAMPLE 1

The process is started up by an initial partial fill of the mix tank 250 with a known amount of liquid sufficient to cover the outlet 210 of mixer 200. A known amount of powder is then added to the liquid in order to make a starting batch with the setpoint concentration. Once this initial batch has been made, the process may run continuously as disclosed above.

A mass of 83.5 kg of VORANOL 3010A polyether polyol from Dow Chemical Co. was initially charged to a 30-gallon mix tank. To this tank was added 16.7 kg of a powder of finely ground polyurethane foam with a maximum particle size of 250 microns. The initial batch was mixed thoroughly using the mixer shown in FIG. 2. The slurry obtained had a concentration of entrained air of about 10% by volume.

Using the process shown in FIG. 1 and the control method in FIG. 6, slurry was pumped from the mix tank, through the vacuum centrifuge and surge tank, and into a storage vessel. The concentration setpoint was 20 pphp (i.e., 20 parts of powder per 100 parts of liquid, or 16.7% by mass), and the flow rate setpoint was 20 kg/min of slurry. Samples of the slurry were taken as it left the process to go into the storage vessel. These samples were tested for slurry concentration by separating the powder from a known weight of slurry by means of filtering the powder from the slurry, washing away the polyol with methylene chloride solvent, drying and weighing the powder. These samples were also tested for entrained bubble volume by filling a 1000-mL graduated cylinder with slurry and observing the change in volume over a 24-hour period at constant temperature. Any volume change indicates the presence of entrained bubbles in the slurry product. For example, a 1-mL volume change would correspond to 0.1% entrained bubble concentration by volume.

The results, as shown in TABLE 1, show no entrained air bubbles in the product slurry, and powder concentrations that are accurately near the setpoint concentration of 20 pphp.

TABLE 1

| sample ID | time (min:sec) | measured powder concentration (pphp) | measured volume % of bubbles in the slurry |
| --- | --- | --- | --- |
| A | 2:30 | 19.9 | 0 |
| B | 2:45 | 20.2 | not measured |
| C | 3:00 | 20.1 | 0 |
| D | 3:15 | 19.8 | 0 |

Figure 10:
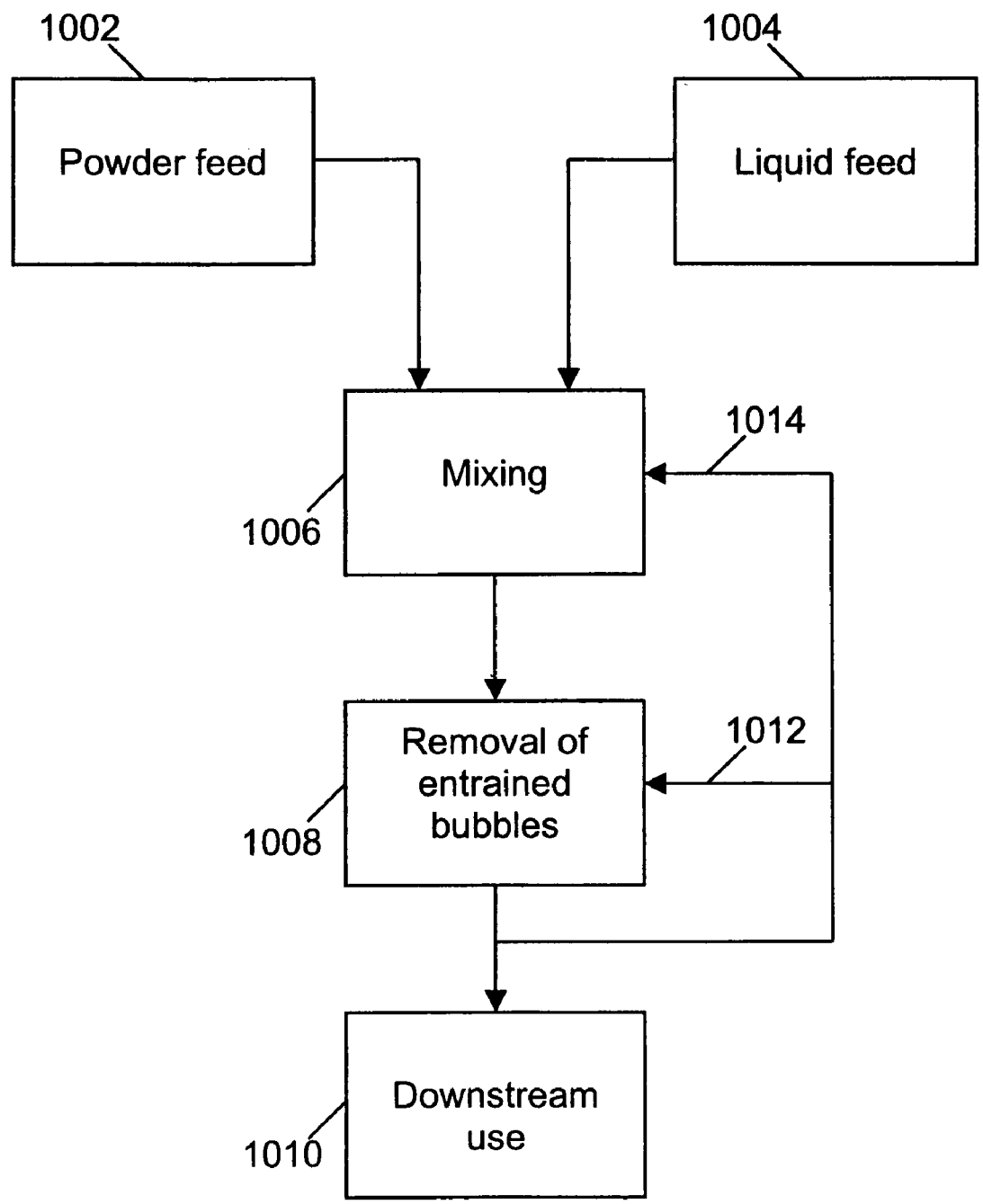
FIG. 10 is a flowchart of the disclosed process for the continuous production of substantially bubble-free slurry.

A flow chart 1000 for the continuous mixing of slurry with removal of entrained bubbles of the present method is shown in FIG. 10. Powder feed 1002 (for example, finely ground polyurethane powder) and liquid feed 1004 (for example, polyol) deliver powder and liquid respectively and both are delivered continuously to a mixing step 1006 (for example, using disclosed mixer 200) where the powder and liquid are contacted intimately and a slurry is produced. The slurry, which may contain entrained air bubbles, is delivered from the mixing step to a de-gassing step 1008, where entrained bubbles are continuously removed. For example, the de-gassing step may use a vacuum centrifuge and may further use the disclosed surge tank described below. Substantially bubble-free slurry is continuously delivered from said de-gassing step to a downstream use 1010. For example, downstream use 1010 may be the production of polyurethane foam. Optionally, some or all of the slurry may be recycled back to the de-gassing step via 1012 or back to the mixing step via 1014.

It should be understood that various alternatives to the embodiments of the disclosed process and apparatus descried herein maybe employed in practicing the disclosed process and using the disclosed apparatus. It is intended that the following claims define the scope of the disclosed process and apparatus and that processes and structures within the scope of these claims and their equivalents be covered thereby.

What is claimed is:

1. A control system for continuous mixing of slurry with removal of entrained bubbles comprising:
a powder and fluid rate control, wherein said powder and fluid rate control is coupled to a mixer through a powder feeder and liquid pump, wherein said powder and fluid rate control further comprises,
a first setpoint;
a two-input powder and fluid rate controller having,
a first input coupled to said first setpoint;
a second input coupled to a level sensor, and
an output coupled to a first input of a first two input calculation element;
a second set point coupled to a second input of said first two-input calculation element, said first two-input calculation element having an output coupled to said powder feeder and;
a second calculation element having,
a first input coupled to said second setpoint and
a second input coupled to said powder feeder to receive an actual rate of powder addition signal, said second calculation element having an output coupled to said level sensor through said liquid pump;
a fluid level control coupled to said mixer and a surge tank; and
a flow rate control coupled to said surge tank.

2. A control system according to claim 1 wherein said output of said second calculation element of said powder and fluid rate control provides a liquid rate signal to said liquid pump through a liquid addition means.

3. A control system according to claim 1 wherein said second calculation element of said powder and fluid rate control further comprises:
a second input coupled to said first setpoint through said two-input powder and fluid rate controller, said second calculation element having an output coupled to said level sensor through said liquid pump.

4. A control system according to claim 3 wherein said output of said second calculation element of said powder and fluid rate controller provides a liquid rate signal to said liquid pump through a liquid addition means.

5. A control system according to claim 1 wherein said powder and fluid rate controller further comprises:
a first powder and fluid setpoint;
a two-input powder and fluid rate controller having,
a first input coupled to said first setpoint,
a second input coupled to a powder and fluid level sensor, and
an output coupled to a first input of a two-input calculation element;
a second powder and fluid setpoint coupled to a second input of said two-input calculation element, said two-input calculation element having a plurality of outputs, wherein:
a first plurality of outputs is coupled to an input of said powder feeder;
a second of said plurality of outputs is coupled to said powder and fluid level sensor through said liquid pump.

6. A control system according to claim 5 wherein said second output of said calculation element of said powder and fluid rate controller provides a fluid rate signal to a driver of said liquid pump through a liquid addition means.

7. A control system according to claim 1 wherein said powder and fluid rate controller receives a signal through said second input from said powder and fluid level sensor indicating the amount of liquid and powder material in said mixer.

8. A control system according to claim 1 wherein said fluid level control further comprises:
a fluid level setpoint;

a fluid level pump having a pump driver with a fluid level sensor; and a two-input fluid level controller having a first input coupled to said fluid level setpoint and a second input coupled to a level sensor and an output coupled to said level sensor through said pump having a pump driver with a fluid level sensor.

9. A fluid level control according to claim 8 further comprising a surge tank coupled between said pump having a pump driver with a fluid level sensor.

10. A control system according to claim 1 wherein said flow rate control further comprises:

a flow rate setpoint;

a flow rate pump having a pump driver with a flow rate sensor; and a two-input flow rate controller having a first input coupled to said flow rate setpoint and a second input coupled to a flow rate sensor and an output coupled to said flow rate sensor through said flow rate pump having a pump driver with a flow rate sensor.

11. A method for controlling the continuous mixing of slurry with removal of entrained bubbles comprising:

providing a powder fluid rate control, wherein said powder and fluid rate control is coupled to a mixer through a powder feeder and liquid pump, wherein said powder and fluid rate control further comprises, a first setpoint;

a two-input powder and fluid rate controller having,
a first input coupled to said first setpoint;
a second input coupled to a level sensor, and
an output coupled to a first input of a first two input calculation element;

a second set point coupled to a second input of said first two-input calculation element, said first two-input calculation element having an output coupled to said powder feeder and;

a second calculation element having,
a first input coupled to said second setpoint and
a second input coupled to said powder feeder to receive an actual rate of powder addition signal, said second calculation element having an output coupled to said level sensor through said liquid pump;

coupling a fluid level control to said mixer and a surge tank; and coupling a flow rate control to said surge tank.

12. A control system according to claim 11 wherein said output of said second calculation element of said powder and fluid rate control provides a liquid rate signal to said liquid pump through a liquid addition means.

13. A method according to claim 11 wherein said second calculation element of said powder and fluid rate control further comprises:

a second input coupled to said first setpoint through said two-input powder and fluid rate controller, said second calculation element having an output coupled to said level sensor through said liquid pump.

14. A method according to claim 13 wherein said output of said second calculation element of said powder and fluid rate controller provides a liquid rate signal to said liquid pump through a liquid addition means.

15. A method according to claim 11 wherein said powder and fluid rate controller further comprises:

a first powder and fluid setpoint;

a two-input powder and fluid rate controller having,
a first input coupled to said first setpoint,
a second input coupled to a powder and fluid level sensor, and
an output coupled to a first input of a two-input calculation element;

a second powder and fluid setpoint coupled to a second input of said two-input calculation element, said two-input calculation element having a plurality of outputs, wherein:
a first plurality of outputs is coupled to an input of said powder feeder;
a second of said plurality of outputs is coupled to said powder and fluid level sensor through said liquid pump.

16. A method according to claim 15 wherein said second output of said calculation element of said powder and fluid rate controller provides a fluid rate signal to a driver of said liquid pump through a liquid addition means.

17. A method according to claim 11 wherein said powder and fluid rate controller receives a signal through said second input from said powder and fluid level sensor indicating the amount of liquid and powder material in said mixer.

18. A method according to claim 11 wherein said fluid level control further comprises:

a fluid level setpoint;

a fluid level pump having a pump driver with a fluid level sensor; and a two-input fluid level controller having a first input coupled to said fluid level setpoint and a second input coupled to a level sensor and an output coupled to said level sensor through said pump having a pump driver with a fluid level sensor.

19. A fluid level control according to claim 18 further comprising a surge tank coupled between said pump having a pump driver with a fluid level sensor.

20. A method according to claim 11 wherein said flow rate control further comprises:

a flow rate setpoint;

a flow rate pump having a pump driver with a flow rate sensor; and a two-input flow rate controller having a first input coupled to said flow rate setpoint and a second input coupled to a flow rate sensor and an output coupled to said flow rate sensor through said flow rate pump having a pump driver with a flow rate sensor.

* * * * *